United States Patent [19]
Forbes et al.

[11] 3,978,658
[45] Sept. 7, 1976

[54] VARIABLE LOAD GAS TURBINE

[75] Inventors: Sheila M. Forbes, Ancaster; Arthur W. J. Upton, Hamilton, both of Canada

[73] Assignee: Westinghouse Canada Limited, Hamilton, Canada

[22] Filed: Mar. 21, 1972

[21] Appl. No.: 236,651

[52] U.S. Cl............................ 60/39.27; 60/39.29; 60/39.37
[51] Int. Cl.[2]...................... F02C 9/14; F02C 9/04
[58] Field of Search............ 60/39.29, 39.37, 39.23, 60/39.2, 39.27, 39.09, 39.03

[56] References Cited
UNITED STATES PATENTS

| | | | |
|---|---|---|---|
| 3,070,131 | 12/1962 | Wheatley | 60/39.23 X |
| 3,080,713 | 3/1963 | Silver | 60/39.29 |
| 3,315,467 | 4/1967 | De Witt | 60/39.29 X |
| 3,543,511 | 12/1970 | Kellett | 60/39.29 |
| 3,584,459 | 6/1971 | Amann | 60/39.29 |
| 3,625,003 | 12/1971 | Liddle | 60/39.29 |
| 3,635,018 | 1/1972 | DeCorso | 60/39.09 |

*Primary Examiner*—Clarence R. Gordon
*Attorney, Agent, or Firm*—F. J. Baehr, Jr.

[57] ABSTRACT

A system for bypassing compressed air and regulating the fuel to rapidly vary the load on a gas turbine so that the turbine can absorb energy and pick up load rapidly without inducing high temperature stresses within the turbine.

3 Claims, 1 Drawing Figure

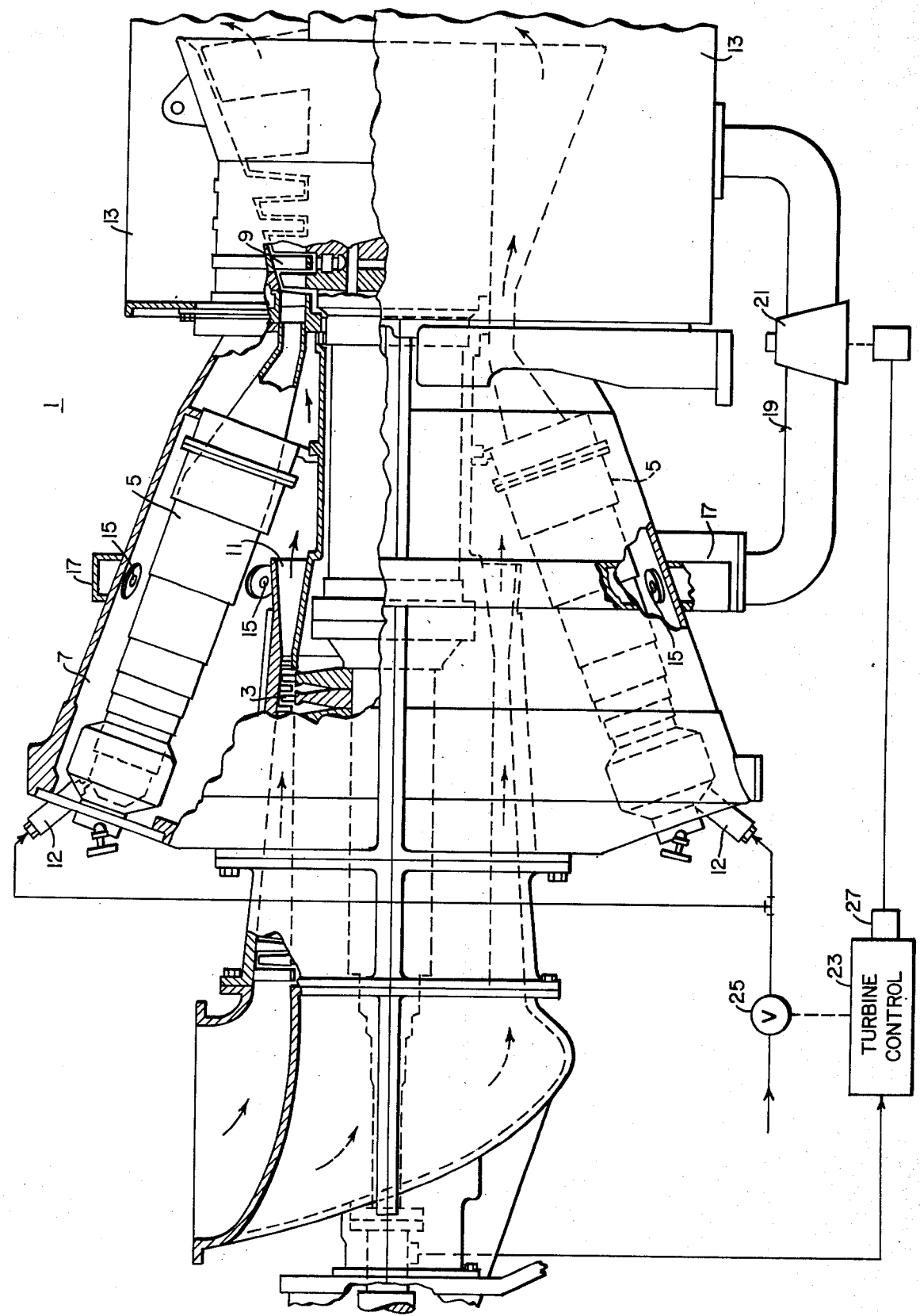

VARIABLE LOAD GAS TURBINE

BACKGROUND OF THE INVENTION

This invention relates to gas turbines and more particularly to controls which rapidly vary the rotating energy produced by the turbine and yet prevent flameout and changes in temperature which produce thermal shock in the high temperature portion thereof.

When a gas turbine is employed as a prime mover to drive an electrical generator to produce electrical power, or to drive a compressor to pump natural gas in a pipe line, there is no need to provide for rapid variations in load, however, there are other instances where the load on the turbine changes drastically and it is necessary to provide for such load changes. For example, when a gas turbine is employed as a prime mover on a ship and is coupled through a generator and motor to the ship's propellers there may be instances when the propellers tend to drive the turbine through the motor and generator. This would be particularly the case, when the ship is designed for icebreaking. In maneuvering an icebreaker it is somewhat required to operate the ship in crash reversal and in such maneuvers the propellers may drive back through the motors which become generators and drive the generator and the turbine. Under such conditions, the turbine over speeds and the governer attempts to reduce the speed of the turbine by closing the fuel control valve, the fuel-air ratio in the primary zone of the combustion chamber may deviate from the stoichiometric ratio to such an extent as to cause flameout, whereafter the turbine becomes inoperable. If the reduction of fuel is limited to a value which will preclude flameout the turbine over speeds and is tripped by an overspeed condition again rendering it inoperable.

One solution for preventing overspeeding is to provide a fly wheel, which is capable of absorbing a large quantity of energy, however, because of the mass and speeds involved, a large fly wheel is not economical so that a more satisfactory energy absorbing system is desirable.

SUMMARY OF THE INVENTION

In general, a gas turbine unit operable to facilitate rapid changes in load, when made in accordance with this invention, comprises a compressor for pressurizing air, at least one combustion chamber in which pressurized air is mixed with a fuel and burned to produce a high temperature motive fluid, a plenum chamber in fluid communication with the compressor and adapted to direct pressurized fluid from the compressor to the combustion chamber, and a turbine portion in fluid communication with the combustion chamber and adapted to convert energy in the high temperature of motive fluid to rotating energy. The turbine portion is connected to the load and the compressor to drive the load and the compressor. Such a turbine unit also comprises a device for rapidly reducing the rotating energy produced by the turbine portion and generally maintaining the temperatures within the turbine portion so that the turbine portion can pick up load rapidly without producing large thermal shocks and stresses therein.

BRIEF DESCRIPTION OF THE DRAWING

The objects and advantages of this invention will become more apparent from reading the following detailed description in connection with the accompanying drawing, in which, the sole FIGURE shows a partial sectional view of a gas turbine made in accordance with this invention.

DESCRIPTION OF THE PREFERRED EMBODIMENT

Referring now to the drawing in detail, there is shown a gas turbine unit 1, which is connected to a load (not shown) such as the generator producing electricity to drive a motor which is coupled to propellers of a ship, particularly an icebreaker. Such a turbine unit must, thus, be adapted to be operable to facilitate rapid changes in load.

The turbine unit 1 comprises a multi-stage compressor portion 3 for compressing or pressurizing a gaseous fluid such as air, and an annular array of combustors or combustion chambers 5, circumferentially disposed around the compressor 3. A plenum chamber 7 encircles the combustion chambers 5 and compressor 3. A multi-stage turbine portion 9, is connected on a single shaft with the compressor 3 and generator (not shown).

The compressor 3 discharges through a diffuser 11, which is in fluid communication with the plenum chamber 7. The combustion chamber 5 is also in fluid communication with the plenum chamber 7 and is supplied with both primary and secondary air therefrom. The primary air admixes with the fuel supplied through a fuel injection nozzle 12 and is burned in the combustion chamber 5, and the products of combustion mix with the secondary air to produce a high temperature motive fluid, which is directed through the various stages of the turbine portion 9, wherein heat and pressure energy in the motive fluid are converted to rotating mechanical energy driving the shaft, compressor and generator. The turbine and compressor portions 9 and 3, respectively, are matched so that during normal operation, generally, the complete output of the compressor portion 3 passes through the turbine portion 9.

The turbine portion 9 exhausts or discharges into an exhaust chamber 13 and the spent gases pass through the exhaust chamber 13 and into an exhaust stack (not shown).

Also shown in the drawing is means for rapidly reducing the rotating energy produced by the turbine portion and generally maintaining the temperature at a generally high level to reduce temperature deviations within the turbine portions within predetermined limits to eliminate thermal shocks and stresses, so that the turbine unit can absorb rotating energy and pick up the load rapidly without harmful effects on the high temperature internal portion of the turbine. The means for reducing rotating energy comprise bleed means for bleeding pressurized air from the plenum chamber 7 and control means for reducing the quantity of fuel supplied to the combustion chamber to a predetermined flow rate.

The means for bleeding compressed air from the plenum chamber 7 comprises a plurality of apertures 15 circumferentially disposed around the plenum chamber 7, a header or collecting duct 17 in fluid communication with the apertures 15 and plenum chamber 7, a conduit 19 in communication with the header 17 and the exhaust chamber 13, and a valve 21 disposed in the conduit 17 for controlling the flow of fluid through the conduit 19 and being responsive to losses of load below a predetermined level and responsive to the speed of the turbine to open and bleed primary air from the plenum chamber 7 to the exhaust chamber 13. The apertures 15, conduit 19 and valve 21 cooperate to bleed off approximately 30% of the pressurized air produced by the compressor 3.

The means for reducing the fuel supply to a predetermined flow rate is incorporated in a governor or turbine control 23 which responds to the speed of the turbine and an output below a predetermined level to reduce the rate at which fuel is being supplied to the combustion chambers to a predetermined quantity. The reduction in the amount of fuel and the reduction in the quantity of pressurized air cooperates to limit the excess air supplied to the combustion chamber 5 to negate flameout and maintain the variation in temperature of the turbine portion 9 within acceptable limits, so that the temperature of the internals remains sufficiently high to allow the turbine to pick up load rapidly without subjecting the internals to severe temperature gradients, which will produce temperature shocks and stresses which reduce their life.

Besides reducing the amount of excess air to the combustion chamber, bleeding 30% of the compressed air substantially reduces the mass flow rate of motive fluid passing through the turbine portion, substantially reducing the output or rotating energy produced by the turbine portion without reducing the work done by the compressor in pressurizing the inlet air. The compressor thus acts as a brake to reduce the load rapidly. The reduction in flow through the turbine coupled with maintaining the air flow through the compressor produces a sufficiently large and rapid reduction in the power output of the turbine unit so that the turbine unit no longer produces excess rotating energy, but accepts or absorbs rotating energy from the load.

The governor 23 and bleed valve 21 respond to signals, which are produced by excessive turbine speed and a shaft power output or torque below a predetermined value to open the bleed valve 21 and reduce the fuel flow to the fuel nozzles 12 to a predetermined minimum rate which will prevent flameout by controlling a fuel control valve 25.

The bleed valve 21 is held open by a timer 27, which will close after a predetermined time interval to prevent stalling the turbine. The time interval that the valve 21 is held open depends on the operating condition of the system.

If during the time interval when the bleed valve 21 is open the operating conditions change and the demand for shaft power output rises above the predetermined level, the governor 23 will over ride the timer 27 closing the valve 21 and increase the rate at which fuel is being supplied allowing the turbine to begin to accept the load imposed thereon. Thus, the turbine unit 1 as hereinbefore described is always ready to accept any additional loading within its operating capabilities, and will react rapidly to reduce its output to such an extent that it accepts load for a predetermined time interval, thus providing a gas turbine which can facilitate rapid and drastic load changes without producing large thermal shocks and stresses on the internal portions thereof and without becoming inoperative due to flameout or an overspeed trip, resulting from short intervals during which the turbine is driven by the load.

What we claim is:

1. A gas turbine unit operable to facilitate rapid changes in a load imposed on said turbine unit, said turbine unit comprising:

a compressor for pressurizing a fluid, a plurality of combustion chambers disposed in annular array in which pressurized fluid is admixed with a fuel and burned to produce a high temperature motive fluid, a plenum chamber encircling and in fluid communication with said combustion chambers and adapted to direct pressurized fluid from said compressor to said combustion chamber, a turbine portion in fluid communication with said combustion chamber and adapted to convert energy in said high temperature motive fluid to rotating energy, said turbine portion being so connected to said load and to said compressor to drive said load and said compressor, and said compressor portion and said turbine portion being matched so that during normal operation generally the complete output of the compressor portion passes through the turbine portion, an exhaust duct into which the motive fluid from the turbine portion is discharged, means for bleeding pressurized fluid from the plenum chamber and means for maintaining the fuel supplied to the combustion chamber at a predetermined flow rate, said bleed means and fuel flow maintaining means cooperating to negate flameout during rapid reduction in load and to maintain the temperature within the turbine portion at a generally high level so that the turbine unit can pick up load rapidly without large thermal shocks and stresses being produced therein, said bleed means comprising a plurality of apertures disposed circumferentially around the plenum chamber, a conduit in fluid communication with said aperture, flow control means disposed in said conduit, and a header in fluid communication with said apertures and said conduit, said flow control means being responsive to the speed of the turbine and the power output of the turbine unit.

2. A turbine unit as set forth in claim 1, wherein the bleed means is capable of reducing the rotating energy produced by the turbine to such a degree that the turbine unit absorbs energy from the load.

3. A turbine unit as set forth in claim 1, wherein the means is only operable for a predetermined time interval to prevent stalling of the turbine.

* * * * *